United States Patent [19]

Bhatti

[11] 4,343,636
[45] Aug. 10, 1982

[54] METHOD AND APPARATUS FOR FORMING GLASS FIBERS

[75] Inventor: Mohinder S. Bhatti, Newark, Ohio

[73] Assignee: Owens-Corning Fiberglas Corporation, Toledo, Ohio

[21] Appl. No.: 255,987

[22] Filed: Apr. 20, 1981

[51] Int. Cl.³ .......................................... C03B 37/025
[52] U.S. Cl. ............................... 65/1; 65/2;
        65/15; 65/374.12; 29/163.5 R; 219/121 EM;
        428/670; 428/940
[58] Field of Search .......... 65/1, 2, 374.12, 15;
        29/163.5; 219/121 EM; 428/670, 940

[56] References Cited

U.S. PATENT DOCUMENTS

| | | | |
|---|---|---|---|
| 3,065,613 | 11/1962 | Wranau | 65/1 |
| 3,235,646 | 2/1966 | Sens | 13/6 |
| 3,248,190 | 4/1966 | Woodward et al. | 65/1 |
| 3,278,282 | 10/1966 | Jaray | 65/1 |
| 3,371,409 | 3/1968 | Bonnet et al. | 29/528 |
| 3,511,306 | 5/1970 | Warkolzewski | 65/15 |
| 3,657,784 | 4/1972 | Selman | 29/195 |
| 3,736,109 | 5/1973 | Darling et al. | 29/195 |
| 4,066,864 | 1/1978 | Heitmann | 219/121 EM |
| 4,140,507 | 2/1979 | Costin et al. | 65/2 |

FOREIGN PATENT DOCUMENTS 1242921  8/1971  United Kingdom ............... 65/1

OTHER PUBLICATIONS

Hot Isostatic Processing MC1C-77-34 Battelle Labs., Columbus, Ohio, Nov. 1977, pp. 1-99.

*Primary Examiner*—Robert L. Lindsay, Jr.
*Attorney, Agent, or Firm*—Ronald C. Hudgens; Robert F. Rywalski; Greg Dziegielewski

[57] ABSTRACT

A laminated wall for a feeder for supplying streams of molten glass to be attenuated into filaments is provided comprising: a refractory metal core having an oxygen impervious, precious metal sheath intimately bonded thereto by hot isostatic pressing to form a laminate, said laminate having at least one aperture extending therethrough; a first element positioned in said aperture, said first element having a flange in abutting engagement with one side of said sheath and an orifice extending therethrough; a second element positioned in said orifice of said first element, said second element having a flange in abutting engagement with an opposite side of said sheath and a passageway adapted to permit said molten glass to flow therethrough; said first element being sealed to said laminate to prevent the oxidation of said core at elevated temperatures.

16 Claims, 5 Drawing Figures

METHOD AND APPARATUS FOR FORMING GLASS FIBERS

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate wherein at least one laminated wall is adapted to permit the passage of streams of molten material therethrough.

BACKGROUND ART

There has been a long-felt need to produce a long lasting feeder for flowing streams of molten inorganic material, such as glass, at operating temperatures as currently practiced or even higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and/or for longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious, previous metal sheath intimately bonded thereto by hot isostatic pressing, said wall having at least one orifice extending therethrough adapted to permit said molten material to pass therethrough.

BEST MODE OF CARRYING OUT THE INVENTION

Figure 1:
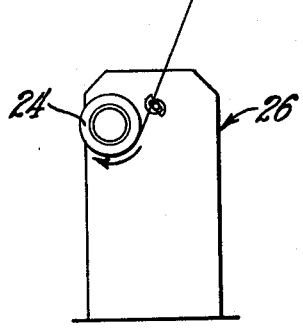
FIG. 1 is a semi-schematic front elevational view of a glass textile type fiber forming system.

As shown in FIG. 1, feeder 10, which is comprised of containment sections or sidewalls 12 and a bottom, working or stream defining wall 14, is adapted to provide a plurality of streams of molten inorganic material, such as glass. The streams of molten glass can be attenuated into filaments 16 through the action of winder 26 or any other suitable means.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

Figure 2:
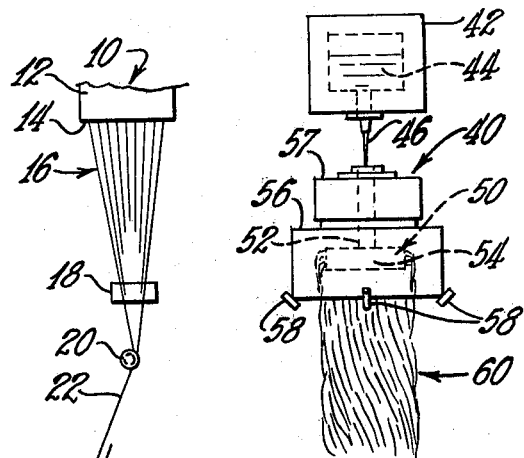
FIG. 2 is a semi-schematic front elevational view of a glass wool or rotary fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds is comprised of a quill 52 and a circumferential stream defining or working wall 54 having a plurality of passageways 88 therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in patent application Ser. No. 200,677, filed on Oct. 27, 1980, in the name of Mohinder S. Bhatti, which is hereby incorporated by reference.

Particularly, such refractory metals are selected from the group of materials consisting of molybdenum (Mo), columbium (Cb), tungsten (W), rhenium (Re) tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been utilized in forming a laminated wall for a fiber forming feeder when clad with a precious metal alloy of platinum and rhodium.

Particularly, the precious metals are selected from a group consisting of platinum (Pt), palladium (Pd), iridium (Ir), osmium (Os), rhodium (Rh), ruthenium (Ru), and alloys based on such metals. Included in the platinum alloys are H alloy and J alloy which are alloys of platinum and rhodium of about 90%/10% and 75%/25% composition, respectively.

As disclosed in the aforementioned patent application, care should be taken in the preparation of the surfaces of the substrate and precious metal layers to insure a good bond between the core and sheath.

Simply stated, the sheath is formed to closely conform to the exterior of the core, with the surfaces thereof being appropriately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

Figure 3:
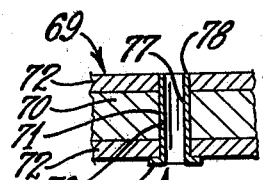
FIG. 3 is an enlarged cross sectional view of the orificed walls of the stream feeders shown in FIG. 1 during fabrication.

As shown in FIG. 3, laminate 69 is formed by hot isostatically pressing core or substrate 70 to sheath 72.

At this point, sheath 72 should completely surround the exterior of core 70.

A plurality of apertures 71 extending through laminate 69 are formed by any suitable means, such as by drilling, or punching. Apertures 71 can be formed in the core 70 and sheath 72 subsequent to the HIP'ing operation or procedure to form laminate 69, or apertures 71 can be formed in core 70 prior to the HIP'ing operation.

Aperture 71, as such, exposes a portion of refractory metal core 70 which may become exposed to an oxidizing atmosphere during operation. However, the laminate with aperture 71 therethrough still may function if molten glass is continuously maintained in the orifice over the refractory metal core to preclude the oxygen containing atmosphere from contacting the core.

However, in plant operation that is not always practical. Therefore, orifice 71 of laminate 69 should be provided with a precious metal coating or liner sealed or bonded to the sheathing 72 and/or core 70 to prevent the oxidization of the core material.

According to the principles of this invention, a pair of flanged tubular elements 74 and 84 are inserted from opposing sides of laminate 69. As can be seen in FIG. 3, first hollow tubular element 74 is inserted in aperture 71 such that sleeve or shaft 76 is registered in aperture 71 and flange or head 75 is in abutting engagement with one side of sheath 72. Preferably, end 78 of first element 74 is prefabricated or subsequently trimmed to register substantially flush with the exterior surface of opposing side of sheath 72. Orifice 77 of first element 74 extends completely therethrough.

Insert or element 74 is, preferably, of the same type of precious metal material as the sheath 72. However, different but compatible materials can be employed, and insert 74 may be a solid plug.

At this point element 74 may be welded or sealed to laminate 69. In one method, flange 75 may be electron beam or laser welded to the portion of sheath 72 associated therewith. Preferably, element 74 is hot isostatically pressed or gas pressure welded to laminate 69 such that sleeve 76 is intimately bonded to sheath 72 and core 70, and such that flange 75 is intimately bonded to sheath 72. Thus, good electrical and thermal conductivity are established through the junction of element 74 and laminate 69.

Consistent with the HIP welding technique set forth in the Metals and Ceramics Information Center Report No. MCIC-77-34 published by the Battelle Columbus Laboratories in November, 1977, the hollow elements 74 may be HIP welded to laminate 69. With the elements 74 inserted in the laminate 69 as shown in FIG. 3, the laminate 69 is placed inside a sheet metal container having a pressure transmitting media tightly packed between the container and the laminate 69 and in the orifice 77 of each element 74. That is, the pressure transmitting media is tightly packed in substantially all the space within the container not occupied by the laminate 69 and elements 74.

The pressure transducing or transmitting media can be of the type known in the art such as powdered metal, beaded or granulated glass such as "Vycor," or amorphous silica. Preferably, orifices 77 are press fit with a solid or fully desified rod of the pressure transducing media, metal or silica, which fluidizes or softens upon the application of heat and pressure during the HIP'ing process as should the rest of the transmitting medium, to insure a full application of pressure to the walls of sleeve 76 to intimately bond the exterior of sleeve 76 to core 70 and/or sheath 72 at orifice 77. Metal rods of molybdenum have been employed successfully.

Preferably, the pressure transducing media should not become so fluid so as to "wick" between the surfaces to be bonded together. Subsequently, the pressure transducing media is removed by any suitable means, such as leaching.

Thus, with HIP welding, flange 75 is metallurgically bonded to sheath 72 and sleeve 76 is metallurgically bonded to laminate 69.

Figure 4:
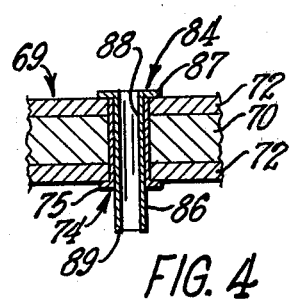
FIG. 4 is an enlarged cross-sectional view of the orificed wall shown in FIG. 1.

Subsequent to the installation of first element 74 in aperture 71, second tubular member 84 is inserted into orifice 77 such that shaft 86 of second tubular member 84 is registered within sleeve 76 of first element 74. Also, flange 87 of second tubular member 84 should be brought into abutting engagement with the opposite side of sheath 72 as shown in FIG. 4. Passageway 88 of second tubular member 84 extends therethrough and is adapted to permit the molten material to flow therethrough, and preferably, membr 84 is of the same material as element 79 and sheath 72.

End 89 of shaft 86 may extend beyond flange 75 of first element 74 to form a "tip-type" fiber forming feeder wall. Of course, end 89 may be registered substantially flush with flange 75 or may even be recessed within sleeve 76 of first element 74.

Passageways 88 can be sized to provide the proper passageway adapted to permit molten glass or inorganic material to flow therethrough as either a stationary or rotatable fiber forming system, that is, for textile or wool operation.

As shown in FIG. 4, tubular member 84 is comprised of a hollow, precious metal shaft 86 having a flange 87 at one end thereof. Passageway 88 extends through shaft 86 and flange 87 and is adapted to permit molten glass and/or inorganic material to flow therethrough.

If first element 74 has been HIP welded to laminate 69 to totally seal core 70 within sheath 72 to prevent the oxidation of the core at elevated temperatures as herein described, second tubular member 84 need only be fastened to laminate 69 by welding or sealing flange 87 to sheath 72. This can be accomplished by employing electron beam or laser welding techniques to weld, for example, the periphery of flange 87 to sheath 72.

Preferably, HIP welding or HIP bonding techniques are employed to seal second tubular member 84, including sleeve 86, to first element 74 and sheath 72 to provide good electrical and thermal contact throughout the wall 14.

Rather than requiring two separate HIP'ing steps, it is possible to simultaneously metallurgically bond laminate 69, first element 74 and second element 84 together in one HIP bonding operation. As such, first element 74 is inserted in aperture 71 from one side of laminate 69 and second member 84 is inserted through orifice 77 of first element 74 from the opposite side of laminate 69. The unsealed assembly of laminate 69 and first and second elements 74 and 84 can then be HIP welded employing the pressure transducing media as previously set forth herein.

To prevent the first and second elements 74 and 84 from becoming disassociated with each other and/or laminate 69, one or more of the following techniques may be employed. For example, flanges 75 and 87 may be tack welded by conventional methods to sheath 72, and/or sleeve 76 may be sized to achieve a friction fit within aperture 71, and shaft 86 may be sized to achieve a friction within orifice 77 to frictionally hold elements 74 and 84 in proper registration with respect to sheat 72 of laminate 69.

Merely electron beam or laser welding flange 75 to one side of sheath 72 and welding flange 87 to the opposite side of sheath 72 in the absence of HIP bonding, at least, shaft 76 to laminate 69 may not provide the desired oxygen impervious seal. During operation oxygen-containing atmosphere may move along the interface between sleeve 76 and shaft 86 and pass around the end 78 of first element 74 and along the interface of sleeve 76 and laminate 69 at aperture 71 thereof. Thus, it may be possible for the readily oxidizable refractory metal core to come in contact with an oxidizing atmosphere at elevated temperatures. Therefore, it is believed that either one or both of the elements 74 and 84 should be HIP welded or bonded to laminate 69.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus, finshield alignments and the like with respect to the fiberization wall and/or tips can remain essentially fixed over the life of the feeder.

Figure 5:
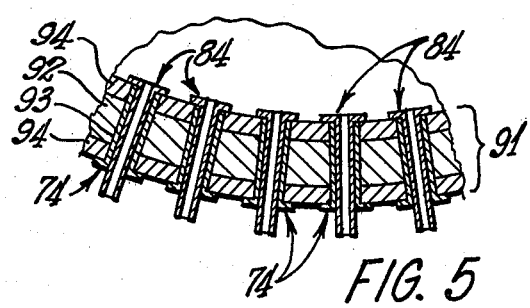
FIG. 5 is an enlarged cross-sectional view of the feeder wall of the feeder forming system shown in FIG. 2.

Laminate 69 can be fabricated, practically in any suitable shape, such as a substantially flat wall to provide a fiberization wall 14, generally, for a textile type feeder, or laminate 91, which is comprised of core 92 and sheath 94, can be fabricated into a cylindrical fiberization wall 54 having tubular elements 74 and 84 registered within apertures 93 as shown in FIG. 5. As such, passageways 88 extend radially outward with flange 87 being located along the I.D. of rotor wall 50 for wool type operations.

For a rotary fiber forming system 40, the circumferential fiberization wall 54 may be formed substantially identical to the system shown in FIG. 4 except that a circumferential wall 54 would be formed as a hoop instead of a substantially flat bottom wall 14.

Other systems for providing a precious metal insert to protect the refractory metal core exposed by the orifices extending therethrough as set forth in the U.S. patent applications: Ser. No. 200,676, filed on Oct. 27, 1980, in the names of Mohinder S. Bhatti and Alfred Marzocchi; Ser. No. 200,650, filed on Oct. 27, 1980, in the name of Mohinder S. Bhatti and Alfred Marzocchi; Ser. No. 200,647, filed on Oct. 27, 1980, in the name of Mohinder S. Bhatti; and Ser. No. 200,651, filed on Oct. 27, 1980, in the name of Mohinder S. Bhatti; all of which are hereby incorporated by reference.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous and/or staple glass filaments.

I claim:

1. A laminated wall for a feeder for supplying streams of glass to be attenuated into filaments comprising:
    a refractory metal core having an oxygen impervious, precious metal sheath intimately bonded thereto by hot isostatic pressing to form a laminate, said laminate having at least one aperture extending therethrough;
    a first element positioned in said aperture, said first element having a flange in abutting engagement with one side of said sheath and an orifice extending therethrough;
    a second element positioned in said orifice of said first element, said second element having a flange in abutting engagement with an opposite side of said sheath and a passageway adapted to permit said molten glass to pass therethrough; said first element being sealed to said laminate to prevent the oxidation of said core at elevated temperatures.

2. The feeder wall of claim 2 wherein said first element is made from precious metal.

3. The feeder wall of claim 2 wherein said second element is sealed to said sheath and said first element.

4. The feeder wall of claim 1 wherein said flange of said second element is electron beam or laser welded to the exterior of said sheath.

5. The feeder wall of claim 1 wherein a portion of said second element extends beyond an end of said first element.

6. The feeder wall of claims 1, 2 or 3 wherein the core is a material selected from the group consisting of Ti, V, Cb, Ta, Cr, Mo, W, Re and base alloys thereof and wherein said sheath is a material of the group consisting of Pt, Pd, Ir, Os, Rh, Ru and base alloys thereof.

7. The feeder wall of claim 1 wherein said refractory metal is an alloy of Mo, Ti, and Zr.

8. The feeder wall of claim 7 wherein said sheath is an alloy of Pt and Rh.

9. The method of making a laminated wall for an inorganic fiber forming feeder comprising:
    supplying a refractory metal core;
    establishing a sheath made from a precious metal having a shape generally conforming to the shape of the core around said core;
    hot isostatically pressing said core and sheath to intimately bond the sheath to the core to form a laminate;
    providing at least one aperture through said laminate;
    inserting a first element in said aperture, said first element having a flange in abutting engagement with a side of said sheath, said first element having an orifice extending therethrough;
    inserting a second element in the orifice of said first element, said second element having a flange in abutting engagement with an opposite side of said sheath;
    providing a passageway through said second element adapted to permit molten inorganic material to flow therethrough; and
    sealing at least said first element to said sheath to protect said core from oxidation at elevated temperatures.

10. The method of claim 9 wherein said passageway is established in said second element prior to insertion of the second element into said first element.

11. The method of claim 9 wherein the flange of the second element is sealed to the sheath by electron beam or laser welding.

12. The method of claim 9 further comprising simultaneously hot isostatically pressing the first element, second element and laminate together.

13. The feeder wall produced according to the method of claims 9, 11 or 12.

14. The method of forming glass fibers comprising:

providing a feeder for supplying molten streams of inorganic material to be attenuated into fibers, said feeder comprising:

a refractory metal core having an oxygen impervious, precious metal sheath intimately bonded thereto by hot isostatic pressing to form a laminate, said laminate having at least one aperture extending therethrough;

a first element positioned in said aperture, said first element having a flange in abutting engagement with one side of said sheath and an orifice extending therethrough;

a second element positioned in said orifice of said first element, said second element having a flange in abutting engagement with an opposite side of said sheath and a passageway adapted to permit said molten glass to pass therethrough; said first element being sealed to said laminate to prevent the oxidation of said core at elevated temperatures; and attenuating the streams of molten glass into fibers.

15. The feeder wall of claim 1 wherein said feeder is substantially stationary.

16. The feeder wall of claim 1 wherein said feeder is rotatable.

* * * * *